Patented Aug. 22, 1933

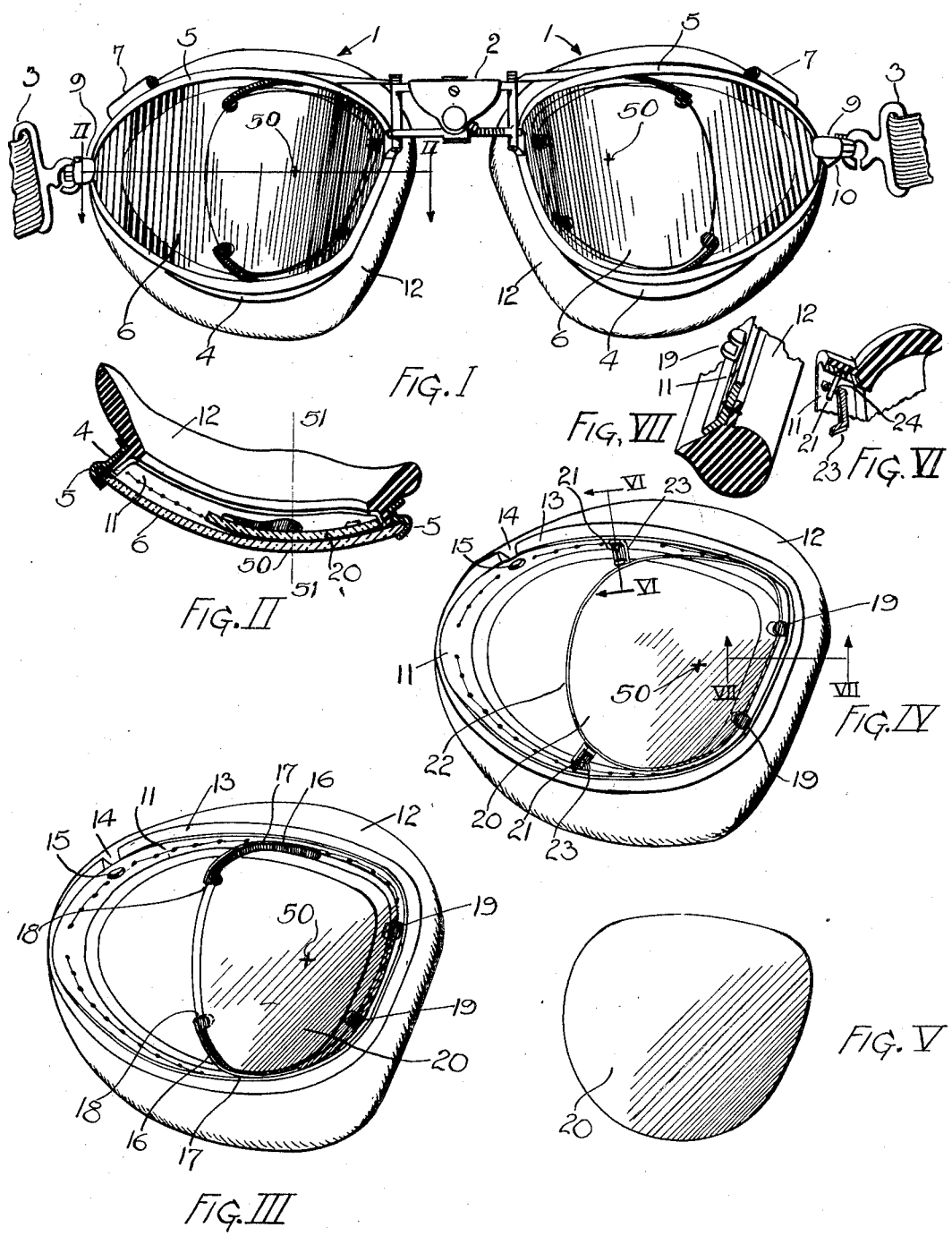

1,923,567

UNITED STATES PATENT OFFICE 1,923,567

OPHTHALMIC MOUNTING

Nelson M. Baker, Southbridge, Mass., assignor to American Optical Company, Southbridge, Mass., a voluntary association of Massachusetts Application August 30, 1929. Serial No. 389,542

14 Claims. (Cl. 88—41)

This invention relates to ophthalmic mountings and has particular reference to an improved type of mounting to be used both for eye protection and eye correction.

The principal object of this invention is to provide a simple and inexpensive means of correcting visual errors while protecting the wearer's eyes with the large size lenses required in aviators' or automobilists' goggles and eye protectors.

Another object of this invention is to provide a corrected field of vision at the nasal side or usable field of vision and a clear vision field at the temporal end of the goggle.

Another object of the invention is to so construct such a mounting that the removal of the correcting means may be easily accomplished without impairing the efficiency of the protecting portion.

Another object of the invention is to make possible the interchanging of the correcting lenses from one mounting to another so that the destruction of the comparatively inexpensive protective lenses will not render useless the more expensive correcting lenses.

Another object of the invention is to provide means to safeguard the correcting lenses from flying objects and other hazards.

Another important object of the invention is to provide means whereby very slight alteration of the aviation goggles now in use in great quantities will allow the wearer's prescriptive power correction to be incorporated therein.

Another object of the invention is to provide means to associate the prescription lens with the face contacting members of the goggles for removal therewith in order that one pair of goggles may be used by several wearers each providing his own prescription lenses and face contact members as units, thus forming an economical and sanitary assembly.

Other objects and advantages will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

Referring to the drawing:

Fig. I is a front view of a pair of goggles embodying the invention.

Fig. II is a section on line II—II of Fig. I.

Fig. III is a view of the face contact member separated from the goggle.

Fig. IV is a view similar to Fig. III but showing a modification.

Fig. V is a view of the prescription lens.

Fig. VI is an enlarged fragmentary section on line VI—VI of Fig. IV.

Fig. VII is an enlarged fragmentary section on line VII—VII of Fig. IV.

It is well known that for aviation, automobiling and other high-speed occupations, that eye protectors with large size lenses are greatly to be preferred in order that a wide angle of vision may be obtained. It is also well known that the present day goggles having large size lenses do not usually have any form of eye-correction incorporated therein, mainly because the peculiar shape necessary to fit closely around the canthus of the eye makes the grinding of these large size lenses to prescription curves extremely difficult and often quite impossible. Where these lenses have been successfully made to incorporate the wearer's prescriptive power correction, several drawbacks of a serious nature have resulted. The principal one of these is the prohibitive cost of such lenses, which inasmuch as they are designed for wear in such hazardous occupations as flying and automobiling where they may easily be broken, renders this process of little use to the average individual requiring eye-correction.

The prime object of my invention, therefore, is to make possible the incorporation of any usual prescriptive eye correction in these goggles without the limitations as to extent of power which can be placed therein or the prohibitive cost of manufacture as was associated with previous attempts at this desirable result. My invention allows any usual prescriptive power correction to be placed in these goggles and renders this beneficial service to be carried out at an extremely low cost while giving results of both efficient and durable nature.

Referring to the drawing wherein similar characters of reference denote corresponding parts throughout the several views the numeral 1 denotes a pair of eyecups joined by an extensible bridge piece 2 and being provided with a head band 3. The eyecups 1 comprise an outer frame 4 which is curved substantially to the contour of the face and has a lip 5 for the reception of a lens 6. The lens 6 may be the usual plano type, decentered as described in Patent No. 1,697,030 if desired, and may either be of spherical surface contour or cylindrical as shown in the drawing. The outer frame 4 has ventilation openings (not shown) in the underside thereof and a tubular suction draft 7 at the top to form means of inducing air circulation throughout the eyecups and prevent fogging of the lenses and overheated eyes when in use.

As shown in the patent referred to above the optical center 50 of the protection lens 6 is preferably located at or adjacent to the line of direct vision 51 of the lens when in place on the face of the wearer that is to say adjacent to the nasal side of the lens and the correction or prescription lens 20 is positioned in line with the protection lens 6 so that the said optical center 50 is in line with the field of said correction lens 20 and preferably adjacent the center of the field of said lens 20 as shown in the drawing.

The outer frame 4 is split at the temporal ends and extensions or endpieces 9 are attached to each half. A clamping member 10 pivoted to one of endpieces 9 holds the split frame together. The clamping member 9 securely locks the frame together and cannot slip or be unlocked until the headband 3 is removed.

Rigidly held in the outer frame 4 is my inner frame or hoop-like supporting member 11 carrying the resilient face contact member 12. The face contact member 12 may be secured to the inner frame 11 by sewing through the lip 13 or other suitable fixation means. In the form illustrated, the face contacting member extends between the inner and outer frame members and serves to space them from each other. It will be apparent that the face contact 12 and inner frame 11 may be removed as a unit from the outer frame 4 by merely unclamping the split ends of the latter. The face contact member 12 is slotted at 14 opposite a hole 15 in the inner frame 11 which locates with the ventilating means 7 in the outer frame 4. Ventilating holes (not shown) are also provided in the underside of the inner frame 11 and arranged so that when the inner frame is assembled in the outer frame, the holes are offset or staggered from the holes in the outer frame to prevent direct air currents reaching the eyes of the wearer.

To carry out the objects of my invention I next provide means for introducing the wearer's prescriptive power correction into the goggle construction described, and I have chosen simple but efficient means to attain this desired result as will be seen from the following description of this part of my invention.

In the preferred form I have shown in Fig. III the inner frame 11 separated from the outer frame 4 and having clips 16 of thin resilient material, preferably metal, fastened by soldering or other suitable method to the inside face of the inner frame 11. These clips 16 are arched at the junction point 17 of their attachment to the frame and have at the terminal end of the arched portion a channel shaped projection 18. Similar projections 19 but without the spring clips 16 are attached by soldering or other suitable method to the nasal side of the inner frame 11.

I can now insert my prescription lens 20 which is preferably of an edge contour to conform to the nasal portion of the goggle as shown in Fig. III by merely pressing the spring clip 16 apart far enough to allow such insertion. The lens is held securely in place by the four clips as shown in Fig. III. Should a cylinder lens be used the axis will not be moved out of place during the use of the goggle and in all ways the invention is eminently suitable for use in hazardous undertakings such as flying and automobiling at high speeds. The prescription lens may be of costly nature with an involved prescription therein and this lens will be protected by the standardized protection lens which is placed thereover in use.

It will also be apparent that the prescription lens 20 may be removed if not required without affecting the appearance of the assembled goggle in any detrimental way. Or if desired the whole inner frame 11 and lens 20 may be removed and another assembly inserted in the same goggle so that one goggle may be used for several different wearers' corrective lenses and also be quite sanitary as regards the face contact member 12 which, as stated, is attached to the inner frame 11 and is removed therewith. It will be obvious that either a rimless or spectacle type lens may be used. In the latter case a modified form of securing means may be used to retain the lens 20 in the inner frame 11.

As shown in Fig. IV the nasal side projections 19 are retained, but the spring clips 16 are not used. Instead, I attach small pegs or pins 21 shown clearly in Fig. VI to the inner frame 11 by riveting or other suitable means and to the rim 22 of my prescription lens 20 I fix the shaped clips 23 by solder or other means. A hole 24 in the clip 23 locates with the pin 21 and so holds the lens 20 in position. It is obvious from this description that when the member 11 is in normal, undeflected position, the rim 22 will be retained in place by the pins 21 and the clips 23. However, if the member 11 is deflected outwardly, the pins 21 will disengage themselves from the clips 23 and the rim 22 will be released. It is also apparent that when the member 11 clamps inside the member 4 it will be reinforced thereby and prevented from being deflected outwardly to release the rim 22.

The inexpensive nature of the device will now be readily apparent and the assembly and operation obvious from the foregoing description.

It will be seen that I have provided means to carry out the objects of the invention in a most simple and economical manner far removed from the expensive and tedious nature of the prior art. Any type of prescriptive correction can be used with the usual type of goggle described herein by making use of the novel means disclosed and it will be readily apparent that an improved type of protective mounting has been devised which will be of great benefit and use.

Having described my invention, I claim:

1. In a device of the character described, a split lens holding frame holding a lens of substantially zero power, a second frame within the first, a lens having prescription power in the second frame and means to close the split first frame together to clamp the second frame in position therein and means to secure the lens having the prescription power in said second frame.

2. In a device of the character described, a lens holding frame holding a protection lens, a second frame within the first, a face contacting member having a part extending between the first and second frames spacing them apart, a lens having prescription power in the second frame, interengaging means between said lens and second frame for holding the lens in said frame and means to clamp the second frame in position within the first, said interengaging means between the prescription lens and second frame preventing the removal of the lens without first having to remove the second frame from the first frame.

3. In a device of the character described, a split lens holding frame holding a protection lens, a second frame within the first, a face contacting member having a part extending between the first and second frames spacing them apart, a lens having prescription power in the second frame, interengaging means between said lens and frame for holding the lens in said frame and means to close the split first frame together to clamp the second frame in position therein, said interengaging means between the prescription lens and frame preventing the removal of the lens without first having to remove the second frame from the first frame.

4. In a device of the character described, a hoop like member, means for holding a lens supported by said hoop like member and interengaging means between said hoop like member and the lens holding means, said interengaging members being in engagement when the hoop like member is in normal undeflected position and said members being out of engagement when the hoop like member is deflected outwardly from said lens holding means and reinforcing means for preventing said hoop-like member from being deflected outwardly from said lens holding means.

5. In a device of the character described, a hoop like member, means for holding a lens supported by said hoop like member and slidingly engaged interengaging members between said hoop like member and lens holding means, said interengaging members being in engagement when the hoop like member is in normal undeflected position and said interengaging members being relatively slidable out of engagement when the hoop like member is deflected outwardly from said lens holding means and a stiffening means for reinforcing said hoop-like member and preventing it from being deflected outwardly from said lens holding means.

6. In a device of the character described, a split lens rim having offset endpieces, means for securing the endpieces together, a hoop like rim, means for holding a lens supported by said hoop like rim, means for securing the hoop like rim in the lens rim, a resilient face engaging portion secured to the hoop like member, and slidingly engaged interengaging members between said hoop like member and the lens holding means supported thereby, said interengaging members being in locked engagement when the hoop like member is in normal position in the lens rim and said interengaging members being relatively slidable out of engagement when the hoop like member is released from said lens rim and deflected outwardly from said lens holding means.

7. In a device of the character described a supporting member, means for holding a lens supported by said supporting member, and interengaging means between said supporting member and the lens holding means said interengaging members being in engagement when the supporting member is in normal, undeflected position, and said members being out of engagement when the supporting member is deflected from said lens holding means and means for preventing the deflection of the supporting member.

8. In a device of the character described, a supporting member, means for holding a lens supported by the supporting member, and interengaging means between said supporting member and lens holding means, one of said means being deflectable, said interengaging members being in engagement when the parts are in normal undeflected position and said members being out of engagement when the deflectable member is deflected and means for preventing the deflection of the deflectable member when the parts are in assembled positions.

9. In a device of the character described, a split rim for holding a lens, means for holding the parts of the split rim together, a hoop-like rim in said split rim, means for holding a second lens supported by said hoop-like rim, a resilient face engaging portion carried by the hoop-like rim, and slidingly engaged interengaging members between said hoop-like rim and the means for holding the second lens said interengaging members being in locked engagement when the hoop-like rim is in normal position in the split lens rim and said interengaging members being relatively slidable out of engagement when the hoop-like rim is released from said split lens rim and deflected outwardly from said second lens holding means.

10. In a device of the character described, a split lens holding frame for holding a protection lens, a second frame within the first, a lens having a prescription power in the second frame, means to clamp the first split frame together to clamp the second frame in position therein and means to secure the lens having the prescription power in said second frame.

11. In a device of the character described, a lens holding frame holding a protection lens, a second frame within the first, a face contacting member secured to one of said frames, a lens having prescription power in the second frame, interengaging means between said lens and second frame for holding the lens in said frame, and means to clamp the second frame in position within the first, said interengaging means between the prescription lens and second frame, preventing the removal of the lens without first removing the second frame from the first frame.

12. In a device of the character described, a split lens holding frame holding a protection lens, a second frame within the first, a face contacting member secured to one of said frames, a lens having prescription power in the second frame, interengaging means between said lens and frame for holding the lens in said frame, and means to close the split first frame together to clamp the second frame in position therein, said interengaging means between the prescription lens and frame, preventing the removal of the lens without first having to remove the second frame from the first frame.

13. In a device of the character described, a goggle eyecup, a protection lens carried by said goggle eyecup and having its optical center between the geometrical center and the nasal side thereof, and a prescription lens mounted within said eyecup behind said protection lens and with its optical center overlying the optical center of said protection lens, whereby said prescription lens will be protected from injury by said protection lens, and whereby vision through said prescription lens and said protection lens will not be impaired by excessive prismatic displacements.

14. In a device of the character described, an inner goggle eyecup member adapted to fit within an outer goggle eyecup member behind a goggle protection lens, means carried within said inner goggle eyecup member for supporting a prescription lens, and a resilient face contacting member secured to said inner goggle eyecup member.

NELSON M. BAKER.